United States Patent
Kannan et al.

(10) Patent No.: US 8,902,229 B2
(45) Date of Patent: Dec. 2, 2014

(54) METHOD AND SYSTEM FOR RENDERING THREE DIMENSIONAL VIEWS OF A SCENE

(75) Inventors: Hariprasad Kannan, Yongin-si (KR); Kiran Nanjunda Iyer, Yongin-si (KR); Kausik Maiti, Yongin-si (KR); Devendra Purbiya, Yongin-si (KR); Ajit Shyamsunder Bopardikar, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 13/144,442

(22) PCT Filed: Jan. 13, 2011

(86) PCT No.: PCT/KR2011/000235
§ 371 (c)(1),
(2), (4) Date: Jul. 13, 2011

(87) PCT Pub. No.: WO2011/087289
PCT Pub. Date: Jul. 21, 2011

(65) Prior Publication Data
US 2012/0280996 A1 Nov. 8, 2012

(30) Foreign Application Priority Data
Jan. 13, 2010 (IN) .............................. 98/CHE/2010

(51) Int. Cl.
*G06T 15/04* (2011.01)
*G06T 15/20* (2011.01)
(52) U.S. Cl.
CPC ...................................... *G06T 15/20* (2013.01)
USPC ........... 345/426; 345/419; 345/420; 345/421; 345/422; 345/582; 382/154; 348/43

(58) Field of Classification Search
USPC ......... 345/419, 420, 421, 422, 426, 427, 582, 345/634; 382/154; 348/43
See application file for complete search history.

(56) References Cited

U.S. PATENT DOCUMENTS

| | | | | |
|---|---|---|---|---|
| 5,923,333 | A * | 7/1999 | Stroyan ........................ | 345/422 |
| 6,097,854 | A * | 8/2000 | Szeliski et al. ............... | 382/284 |
| 6,215,496 | B1 * | 4/2001 | Szeliski et al. ............... | 345/419 |
| 6,373,485 | B2 * | 4/2002 | Sowizral et al. ............. | 345/421 |
| 6,466,207 | B1 * | 10/2002 | Gortler et al. ................ | 345/427 |

(Continued)

OTHER PUBLICATIONS

International Search Report, mailed Sep. 20, 2011, in corresponding International Application No. PCT/KR2011/000235 (4 p.).

*Primary Examiner* — Kimbinh T Nguyen
(74) *Attorney, Agent, or Firm* — Staas & Halsey LLP (57) ABSTRACT

The present invention provides a method and system of generating multilayered point based 3D representation of a scene. The method includes constructing an alpha model of randomly selected regions associated with objects with similar depth value and depth jump in a depth map of a scene, and identifying mixed pixel regions associated with edges of the objects. The method further includes estimating color, depth and transparency values for pixels in each identified mixed pixel region using associated color information from an image map of the scene, associated depth value information from the depth map, and transparency information from the alpha model based on the associated depth information. The method includes generating a multi-layered point based 3D representation of the scene by organizing the estimated color, transparency, and depth values. Moreover, the method includes rendering 3D views of the scene using the multi-layered point based 3D representation of the scene.

19 Claims, 5 Drawing Sheets

(56) References Cited

U.S. PATENT DOCUMENTS

| | | | |
|---|---|---|---|
| 7,085,409 B2* | 8/2006 | Sawhney et al. | 382/154 |
| 7,907,793 B1 | 3/2011 | Sandrew | |
| 8,213,711 B2* | 7/2012 | Tam et al. | 382/162 |
| 8,217,941 B2* | 7/2012 | Park et al. | 345/427 |
| 8,390,622 B2* | 3/2013 | Park et al. | 345/427 |
| 8,488,868 B2* | 7/2013 | Tam et al. | 382/154 |
| 2003/0048266 A1 | 3/2003 | Han et al. | |
| 2007/0024614 A1 | 2/2007 | Tam et al. | |
| 2007/0103479 A1 | 5/2007 | Kim et al. | |
| 2008/0143715 A1* | 6/2008 | Moden et al. | 345/422 |
| 2012/0120054 A1* | 5/2012 | Sandrew et al. | 345/419 |
| 2012/0242790 A1* | 9/2012 | Sandrew et al. | 348/43 |

\* cited by examiner

METHOD AND SYSTEM FOR RENDERING THREE DIMENSIONAL VIEWS OF A SCENE

TECHNICAL FIELD

The present invention relates to the field of image-based rendering system, and more particularly relates to rendering three dimensional views of a scene.

BACKGROUND ART

Image-based rendering generates a resultant image from a random viewpoint based on three-dimensional space data of an original certain standard viewpoint (or camera). In such image-based rendering, since a real image can be input, a derivable resultant image may be generated that looks like the same real image but from a different viewpoint. One type of image rendering is a three-dimensional depth image-based rendering method, where a resultant image is rendered by using original image information and spatial depth values measured from a depth map for points and/or pixels within the original image.

Such image-based rendering technique relies on one-to-one match between pixels within the original image and the depth map. In reality, points at edges of objects map to the same pixel. Despite techniques to refine the depth map, in which edges of objects in the depth map follow edges of the objects in the original image very closely, the problem of many-to-one mapping is not solved. For example, the three-dimensional image rendering technique fails to preserve soft edges of the objects in rendered 3D views, thereby introducing artifacts such as a 'halo' effect at one or more edges of the objects or jagged edges. Also, the current depth image based rendering techniques use image matting for computing transparency value for pixels at edges associated with each of the objects and hence requiring higher computation time.

DISCLOSURE

The present invention provides a method and system of generating multilayered point based 3D representation of a scene. In one aspect, a method includes constructing an alpha model of randomly selected regions associated with objects with similar depth value and depth jump in a depth map of a scene, and identifying mixed pixel regions associated with edges of the objects.

The method further includes estimating colour, depth and transparency values for pixels in each identified mixed pixel region using associated colour information from an image map of the scene, associated depth value information from the depth map, and transparency information from the alpha model based on the associated depth information. The method includes generating a multi-layered point based 3D representation of the scene by organising the estimated colour, transparency, and depth values. Moreover, the method includes rendering 3D views of the scene using the multi-layered point based 3D representation of the scene.

In another aspect, a non-transitory computer-readable storage medium having instruction to generate a multi-layered point based 3D representation of a scene stored therein, that when executed by a depth-image based rendering system, cause the depth-image based rendering system to perform the method described above.

In yet another aspect, a depth-image based rendering system includes a processor, and memory coupled the processor. The memory includes a multilayered representation module and a 3D view rendering module. The multilayered representation module constructs an alpha model of one or more randomly selected regions associated with one or more objects with similar depth value and depth jump in a depth map of a scene. Further, the multilayered representation module identifies mixed pixel regions associated with edges of the objects in the depth map. Furthermore, the multilayered representation module estimates colour, depth and transparency values for pixels in each of the identified mixed pixel regions using associated colour information from an image map of the scene, associated depth value information from the depth map, and transparency information from the alpha model based on the associated depth information.

Moreover, the multilayered representation module generates a multi-layered point based 3D representation of the scene by organising the estimated colour, transparency, and depth values. Accordingly, the 3D view rendering module renders one or more 3D views of the scene using the multi-layered point based 3D representation of the scene, where the multi-layered point based 3D representation of the scene enables preserving soft edges of the plurality of objects in the one or more 3D views.

Other features of the embodiments will be apparent from the accompanying drawings and from the detailed description that follows.

The drawings described herein are for illustration purposes only and are not intended to limit the scope of the present disclosure in any way.

MODE FOR INVENTION

The present invention provides a method and system of rendering a three dimensional (3D) view of a scene. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
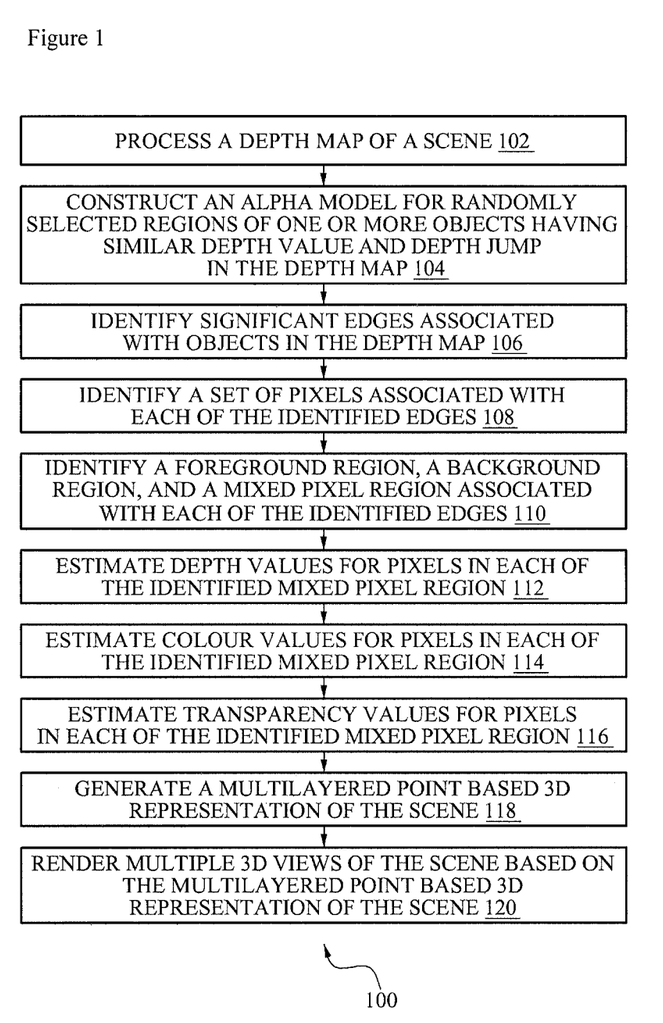
FIG. 1 illustrates a process flow chart of an exemplary method of generating a multilayered point based three dimensional (3D) representation of a scene, according to one embodiment.

FIG. 1 illustrates a process flow chart of an exemplary method of generating a multilayered point based 3D representation of a scene, according to one embodiment. At step 102, a depth map of a scene is processed. In some embodiments, noise and compressed artifacts in the depth map of the scene are filtered (e.g., using a bilateral filter, a median filter and the like). In these embodiments, edges of a plurality of objects in the depth map are aligned to texture edges.

At step 104, an alpha model is constructed for randomly selected regions associated with one or more objects in the depth map. The randomly selected regions may be variable sized windows including edges of the one or more objects. The variable sized windows are selected such that the one or more objects are having similar depth value and depth jump. In one embodiment, the alpha model indicates variation of transparency value in the randomly selected regions. It can be noted that, thickness of a mixed pixel region around an edge of an object scales according to a depth value within a scene. Hence, the alpha model can be scaled (e.g., using linear interpolation technique) and transparency values can be assigned to edges of the objects based on associated depth value and depth jump. This helps reduce significant computation time required to compute a transparency value for each edge of the objects.

At step 106, significant edges associated with the objects in the depth map of the scene are identified. At step 108, a set of pixels associated with each of the identified edges is identified. At step 110, a foreground region, a background region and a mixed pixel region associated with each of the identified edges are identified based on the identified set of pixels using morphological operations. A know number of dilations and erosions are performed on separate buffers of the associated region to identify the background region, the foreground region and the mixed pixel region associated with each of the identified edges. It can be noted that, object features lost during the morphological operation are recovered by performing an inverse morphological operation on the corresponding buffer and XOR-ing with the original associated region.

At step 112, depth values for pixels in each of the identified mixed pixel regions are estimated based on associated depth information of the foreground region and the background region in the depth map. In one embodiment, the depth values are assigned to the pixels through a gradient based extension technique. For example, for each mixed pixel region, a dilation operation is performed directly on depth values of associated foreground region using a 3×3 square structuring element. Accordingly, a new set of pixels formed during the dilation operation is added to the original foreground region. Further, the dilation operation is performed recursively on the new set of pixels till the depth values are assigned to the pixels in the mixed pixel region using the depth information of the foreground region. Similarly, the above steps are performed on the background region to estimate depth values of the pixels using the depth information of the background region.

At step 114, colour values for the pixels in each of the identified mixed pixel regions are estimated based on associated colour information of the foreground region and the background region in the image map. For example, a dilation operation is performed to dilate a binary map corresponding to the identified foreground region using a 3×3 square structuring element. It can be noted that the center pixel of the 3×3 square structuring element is assigned average color of the pixels that fall within the 3×3 square structuring element. Similarly, a binary map corresponding to the identified background region is dilated using a 3×3 square structuring element.

At step 116, transparency values for the pixels in each of the identified mixed pixel regions are estimated using the alpha model based on depth value and depth jump at each of the identified mixed pixel regions. For example, a dilation operation is performed on the associated foreground region using a three pixel wide diamond shaped structuring element. After each iteration, new pixels are assigned a corresponding transparency value from the alpha model.

At step 118, a multi-layered point based 3D representation of the scene is generated by organising the estimated colour, transparency, and depth values. At step 120, 3D views of the scene are rendered using the multi-layered point based 3D representation of the scene. In some embodiments, the multi-layered point based 3D representation of the scene enables preserving soft edges of the plurality of objects in the rendered 3D views.

Figure 2:
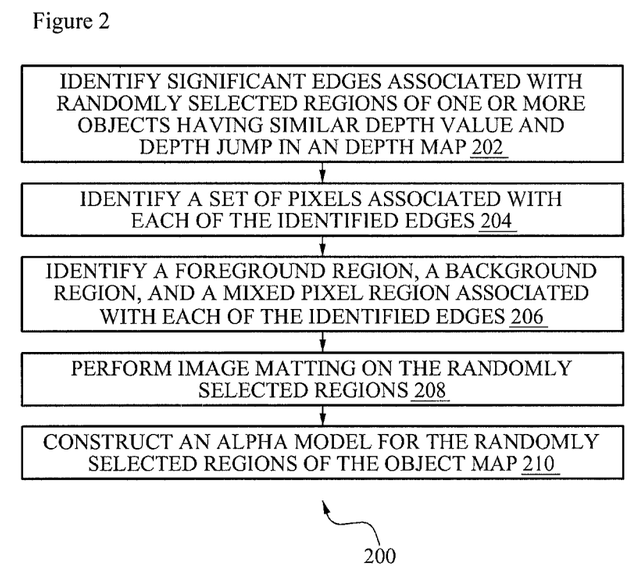
FIG. 2 illustrates a process flow chart of an exemplary method of constructing the alpha model for randomly selected regions associated with one or more objects in the depth map, according to one embodiment.

FIG. 2 illustrates a process flow chart of an exemplary method of constructing the alpha model for randomly selected regions associated with one or more objects in the depth map, according to one embodiment. At step 202, significant edges associated with the randomly selected regions of the one or more objects are identified. At step 204, a set of pixels associated with the identified edge in each of the randomly selected regions is identified. It can be noted that, the size of the random region is varied according to shape of the object within its neighbourhood. If gap between two foreground objects is small, the neighbourhood window of one object may include other object(s) that may be identified as part of the background region of the said one object. Also, the results of image matting are accurate when edge(s) of an object are within bounds of the neighborhood window.

Figure 3:
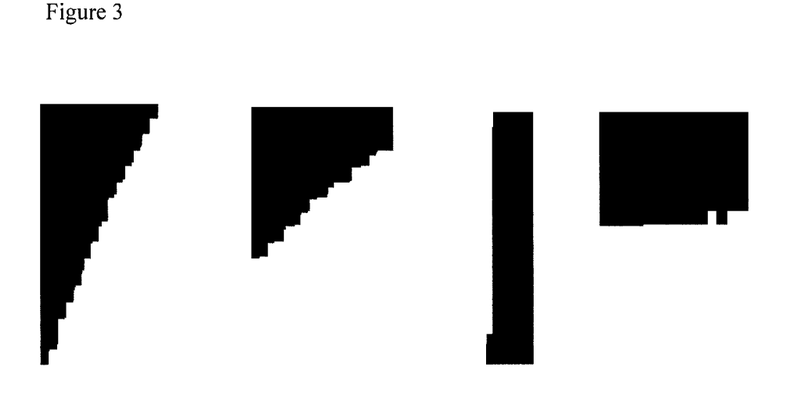
FIG. 3 illustrates sample regions used for constructing an alpha model.
Figure 6:
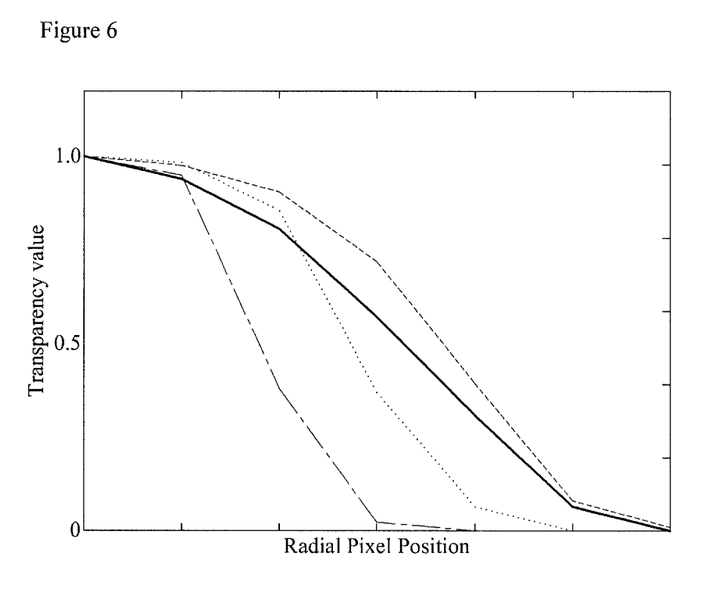
FIG. 6 illustrates the alpha model constructed using the sample regions, according to one embodiment.

At step 206, a foreground region, a background region and a mixed pixel region are identified based on the identified set of pixels. It is appreciated that, the step 206 is performed in a similar manner as described in the above step 110. At step 208, image matting is performed on the randomly selected regions in corresponding image map based on the identified foreground region, background region and mixed pixel region. At step 210, the alpha model of the randomly selected regions is constructed based on the results of image matting. It can be noted that the transparency value varies radially from a value of one to zero at edges of the objects which can be captured using a dilation operation. Upon completion of image matting, a binary map representing a definite foreground region is obtained in which the transparency value for pixel positions is one and is a first entry in the alpha model. Further, the dilation operation is performed on the binary map and corresponding transparency values are averaged for a new set of pixel positions. The averaged value represents a next value in the alpha model. The above process is repeated till entire variation of transparency from one to zero in the radial direction is captured. FIG. 3 illustrates sample regions used for constructing an alpha model and FIG. 6 illustrates the alpha model constructed using the sample regions, according to one embodiment.

Figure 4:
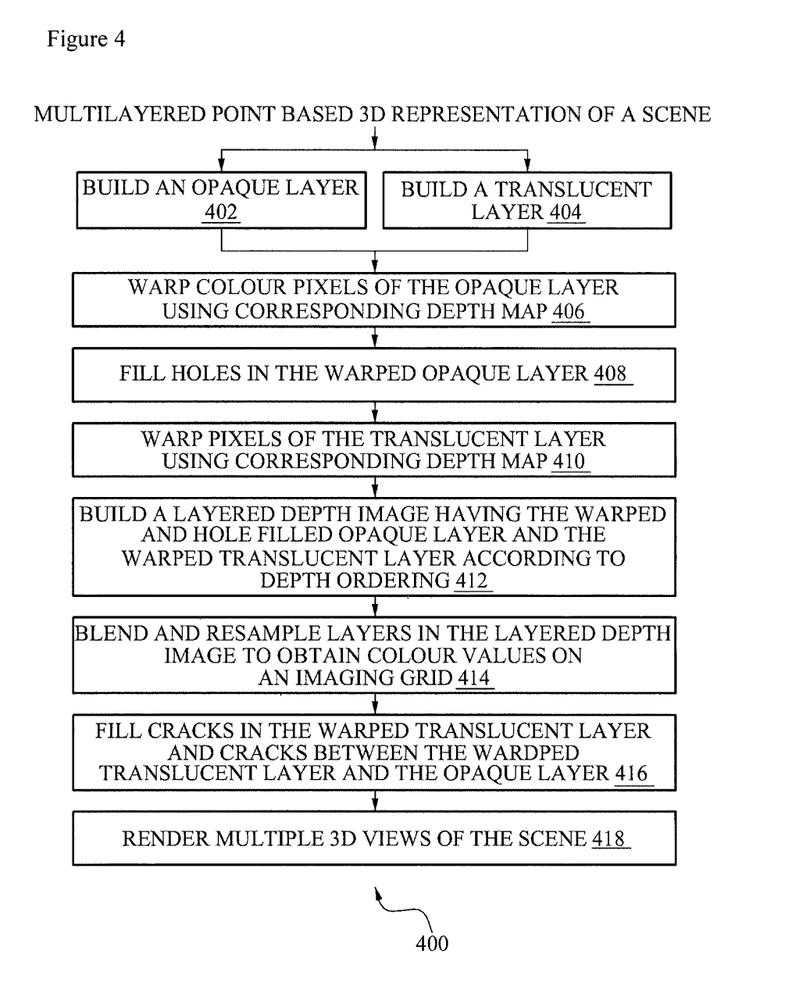
FIG. 4 illustrates a process flowchart of an exemplary method of rendering 3D views of the scene using the multi-layered point based 3D representation of the scene, according to one embodiment.

FIG. 4 illustrates a process flowchart of an exemplary method of rendering 3D views of the scene using the multi-layered point based 3D representation of the scene, according to one embodiment. At step 402, an opaque layer representing parts of the scene is built. In case of more than two layers, background layers are blended to obtain the opaque layer having colour and depth information. At step 404, a translucent layer including colour, depth and transparency information is built. It can be noted that the translucent layer is present at all depth jumps of the opaque layer. The translucent layer can be built by a reconstructed function describing scaling of the alpha model according to the depth values from rendering view point. At step 406, color pixels of the opaque layer are warped using the corresponding depth map. At step 408, holes in the warped opaque layer are filled using techniques including but not limited to inpainting, texture synthesis, and extension of background.

At step 410, pixels of the translucent layer are warped using the corresponding depth map. At step 412, a layered depth image having the warped and hole filled opaque layer and the warped translucent layer is built according to depth ordering. In the layered depth image, the warped and hole filled opaque layer occupies a bottom most layer and the warped translucent pixels occupies layers above the bottom most layer. It can be noted that, samples spatially close to each other are processed based on spatial proximity and the magnitude of transparency values. At step 414, the layers in the layered depth image are blended and resampled to obtain colour values on an imaging grid. At step 416, cracks in the warped translucent layer and in between the translucent layer and the opaque layer are filled. At step 418, 3D views of the scene are rendered as a synthesized output image or video.

Moreover, a non-transitory computer-readable storage medium having instructions stored therein, that when executed by an depth-image based rendering system, cause the depth-image based rendering system to perform the method described in FIGS. 1, 2 and 4.

Figure 5:
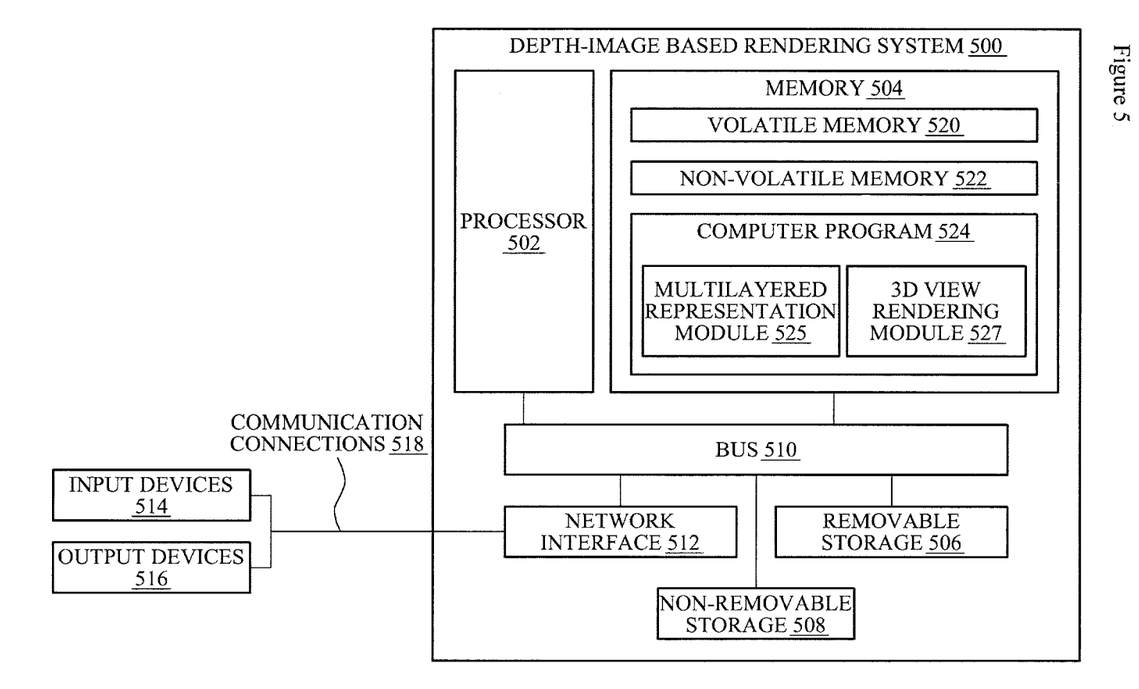
FIG. 5 shows an example of a depth-image based rendering system 500 for implementing one or more embodiments of the present subject matter.

FIG. 5 shows an example of a depth-image based rendering system 500 for implementing one or more embodiments of the present subject matter. FIG. 5 and the following discussion are intended to provide a brief, general description of the suitable depth-image based rendering system 500 in which certain embodiments of the inventive concepts contained herein may be implemented.

The depth-image based rendering system 500, such as a 3D television device, may include a processor 502, memory 504, a removable storage 506, and a non-removable storage 508. The depth-image based rendering system 500 additionally includes a bus 510 and a network interface 512. The depth-image based rendering system 500 may include or have access to one or more user input devices 514, one or more output devices 516, and one or more communication connections 518 such as a network interface card, high definition media interface, or a universal serial bus connection. The one or more user input devices 514 may be a remote control, touch screen the like. The one or more output devices 514 may be a display of the depth-image based rendering system 500.

The memory 504 may include volatile memory 520 and non-volatile memory 522. A variety of computer-readable storage media may be stored in and accessed from the memory elements of the depth-image based rendering system 500, such as the volatile memory 520 and the non-volatile memory 522, the removable storage 504 and the non-removable storage 508. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 504 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 502 of the depth-image based rendering system 500. For example, a computer program 524 may include a multi-layered representation module 525 and a 3D view rendering module 527 in the form of machine-readable instructions capable of generating multilayered point based 3D representation of a scene and rendering 3D views based on the multilayered point based 3D representation of the scene, according to the teachings and herein described embodiments of the present subject matter, such as steps described in FIGS. 1 through 4. In one embodiment, the computer program 524 may be included on a compact disk-read only memory (CD-ROM) and loaded from the CD-ROM to a hard drive in the non-volatile memory 522. The machine-readable instructions may cause the depth-image based rendering system 500 to encode according to the various embodiments of the present subject matter.

For example, the multilayered representation module 525 constructs an alpha model of randomly selected regions associated with one or more objects in a depth map of the scene. The multilayered representation module 525 identifies mixed pixel regions associated with edges of the objects in the depth map. The multilayered representation module 525 estimates colour, depth and transparency values for pixels in each of the identified mixed pixel regions using associated colour information from an image map of the scene, associated depth value information from the depth map, and transparency information from the alpha model based on the associated depth information. The multilayered representation 525 generates a multi-layered point based 3D representation of the scene by organising the estimated colour, transparency, and depth values. The 3D view rendering module 527 renders one or more 3D views of the scene using the multi-layered point based 3D representation of the scene.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A computer implemented method of generating a multi-layered point based 3D representation of a scene comprising:
constructing an alpha model of one or more randomly selected regions associated with at least one of a plurality of objects in a depth map of a scene, wherein the one or more randomly selected regions are associated with edges of the at least one of the plurality of objects and are having similar depth value and depth jump, and wherein the alpha model indicates variation of a transparency value in the one or more randomly selected regions;

identifying mixed pixel regions associated with edges of the plurality of objects in the depth map, the mixed pixel regions including pixels corresponding to image data of the at least one of the plurality of objects having similar depth value and image data having a different depth value;

estimating colour, depth and transparency values for pixels in each of the identified mixed pixel regions using associated colour information from an image map of the scene, associated depth value information from the depth map, and transparency information from the alpha model based on the associated depth information;

generating a multi-layered point based 3D representation of the scene by organising the estimated colour, transparency, and depth values; and rendering one or more 3D views of the scene using the multi-layered point based 3D representation of the scene, wherein the multi-layered point based 3D representation of the scene enables preserving soft edges of the plurality of objects in the one or more 3D views.

2. The method of claim 1, further comprising:
filtering noise and compressed artifacts in the depth map of the scene; and
aligning edges of the plurality of objects in the depth map to texture edges.

3. The method of claim 2, wherein constructing the alpha model of the one or more randomly selected regions of the at least one of a plurality of objects in the depth map of the scene comprises:
identifying edges associated with the one or more randomly selected regions of the at least one of the plurality of objects in the depth map of the scene;
identifying a set of pixels associated with the identified edge in each of the one or more randomly selected regions;
identifying a foreground region, a background region and a mixed pixel region based on the identified set of pixels;
performing image matting on the one or more randomly selected regions in the image map based on the identified foreground region, background region and mixed pixel region; and
constructing the alpha model of the one or more randomly selected regions based on the results of image matting.

4. The method of claim 3, wherein identifying the mixed pixel regions associated with the edges of the plurality of objects in the depth map comprises:
identifying edges associated with the plurality of objects in the depth map of the scene;
identifying a set of pixels associated with each of the identified edges of the plurality of objects; and
identifying a foreground region, a background region and a mixed pixel region associated with each of the identified edges based on the identified set of pixels.

5. The method of claim 4, wherein estimating the colour, depth and transparency values for pixels in each of the identified mixed pixel regions comprises:
estimating depth values for the pixels in each of the identified mixed pixel regions based on associated depth information of the foreground region and the background region in the depth map;
estimating colour values for the pixels in each of the identified mixed pixel regions based on associated colour information of the foreground region and the background region in the image map; and
estimating transparency values for the pixels in each of the identified mixed pixel regions using the alpha model based on depth value and depth jump at each of the identified mixed pixel regions.

6. The method of claim 1, wherein the multi-layered point based 3D representation of the scene comprises a layered depth image (LDI).

7. A non-transitory computer-readable storage medium having instruction to generate a multi-layered point based 3D representation of a scene stored therein, that when executed by a depth-image based rendering system, cause the depth-image based rendering system to perform a method comprising:
constructing an alpha model of one or more randomly selected regions associated with at least one of a plurality of objects in a depth map of a scene, wherein the one or more randomly selected regions are associated with edges of the at least one of the plurality of objects and are having equal depth value and depth jump, and wherein the alpha model indicates variation of a transparency value in the one or more randomly selected regions;
identifying mixed pixel regions associated with edges of the plurality of objects in the depth map, the mixed pixel regions including pixels corresponding to image data of the at least one of the plurality of objects having similar depth value and image data having a different depth value;
estimating colour, depth and transparency values for pixels in each of the identified mixed pixel regions using associated colour information from an image map of the scene, associated depth value information from the depth map, and transparency information from the alpha model based on the associated depth information;
generating a multi-layered point based 3D representation of the scene by organising the estimated colour, transparency, and depth values; and
rendering one or more 3D views of the scene using the multi-layered point based 3D representation of the scene, wherein the multi-layered point based 3D representation of the scene enables preserving soft edges of the plurality of objects in the one or more 3D views.

8. The storage medium of claim 7, wherein the method further comprises:
filtering noise and compressed artifacts in the depth map of the scene; and
aligning edges of the plurality of objects in the depth map to texture edges.

9. The storage medium of claim 8, wherein the instructions to construct the alpha model of the one or more randomly selected regions of the at least one of a plurality of objects in the depth map of the scene comprises:
identifying edges associated with the one or more randomly selected regions of the at least one of the plurality of objects in the depth map of the scene;
identifying a set of pixels associated with the identified edge in each of the one or more randomly selected regions;
identifying a foreground region, a background region and a mixed pixel region based on the identified set of pixels;
performing image matting on the one or more randomly selected regions in the image map based on the identified foreground region, background region and mixed pixel region; and
constructing the alpha model of the one or more randomly selected regions based on the results of image matting.

10. The storage medium of claim 8, wherein the instructions to identify the mixed pixel regions associated with the edges of the plurality of objects in the depth map comprises:

identifying edges associated with the plurality of objects in the depth map of the scene;

identifying a set of pixels associated with each of the identified edges of the plurality of objects; and identifying a foreground region, a background region and a mixed pixel region associated with each of the identified edges based on the identified set of pixels.

11. The storage medium of claim 10, wherein the instructions to estimate the colour, depth and transparency values for pixels in each of the identified mixed pixel regions comprises:

estimating depth values for the pixels in each of the identified mixed pixel regions based on associated depth information of the foreground region and the background region in the depth map;

estimating colour values for the pixels in each of the identified mixed pixel regions based on associated colour information of the foreground region and the background region in the image map; and estimating transparency values for the pixels in each of the identified mixed pixel regions using the alpha model based on depth value and depth jump at each of the identified mixed pixel regions.

12. A depth-image based rendering system comprising:
a processor; and
memory coupled the processor, wherein the memory comprises a multilayered representation module for constructing an alpha model of one or more randomly selected regions associated with at least one of a plurality of objects in a depth map of a scene, for identifying mixed pixel regions associated with edges of the plurality of objects in the depth map, the mixed pixel regions including pixels corresponding to image data of the at least one of the plurality of objects having similar depth value and image data having a different depth value, for estimating colour, depth and transparency values for pixels in each of the identified mixed pixel regions using associated colour information from an image map of the scene, associated depth value information from the depth map, and transparency information from the alpha model based on the associated depth information, and for generating a multi-layered point based 3D representation of the scene by organising the estimated colour, transparency, and depth values, and a 3D view rendering module for rendering one or more 3D views of the scene using the multi-layered point based 3D representation of the scene, wherein the multi-layered point based 3D representation of the scene enables preserving soft edges of the plurality of objects in the one or more 3D views.

13. The system of claim 12, wherein the one or more randomly selected regions are associated with edges of the at least one of the plurality of objects, and wherein the one or more randomly selected regions are associated with equal depth value and depth jump.

14. The system of claim 12, wherein the alpha model indicates variation of a transparency value in the one or more randomly selected regions.

15. The system of claim 12, wherein the multilayered representation module filters noise and compressed artifacts in the depth map of the scene, and aligns edges of the plurality of objects in the depth map to texture edges.

16. The system of claim 12, wherein in constructing the alpha model of the one or more randomly selected regions of the at least one of a plurality of objects in the depth map of the scene, the multilayered representation module identifies edges associated with the one or more randomly selected regions of the at least one of the plurality of objects in the depth map of the scene, identifies a set of pixels associated with the identified edge in each of the one or more randomly selected regions, identifies a foreground region, a background region and a mixed pixel region based on the identified set of pixels, performs image matting on the one or more randomly selected regions in the image map based on the identified foreground region, background region and mixed pixel region, and constructs the alpha model of the one or more randomly selected regions based on the results of image matting.

17. The system of claim 12, wherein in identifying the mixed pixel regions associated with the edges of the plurality of objects in the depth map, the multilayered representation module identifies edges associated with the plurality of objects in the depth map of the scene, identifies a set of pixels associated with each of the identified edges of the plurality of objects, identifies a foreground region, a background region and a mixed pixel region associated with each of the identified edges based on the identified set of pixels.

18. The system of claim 12, wherein in estimating the colour, depth and transparency values for pixels in each of the identified mixed pixel regions, the multilayered representation module estimates depth values for the pixels in each of the identified mixed pixel regions based on associated depth information of the foreground region and the background region in the depth map, estimates colour values for the pixels in each of the identified mixed pixel regions based on associated colour information of the foreground region and the background region in the image map, and estimates transparency values for the pixels in each of the identified mixed pixel regions using the alpha model based on depth value and depth jump at each of the identified mixed pixel regions.

19. The system of claim 13, wherein the multi-layered point based 3D representation of the scene comprises a layered depth image (LDI).

* * * * *